(12) United States Patent
Roller (10) Patent No.: US 6,414,801 B1
(45) Date of Patent: Jul. 2, 2002

(54) CATADIOPTRIC LIGHT EMITTING DIODE ASSEMBLY

(75) Inventor: Philip C. Roller, Ashville, NY (US)

(73) Assignee: Truck-Lite Co., Inc., Falconer, NY (US)

( * ) Notice: Subject to any disclaimer, the term of this patent is extended or adjusted under 35 U.S.C. 154(b) by 0 days.

(21) Appl. No.: 09/482,669

(22) Filed: Jan. 13, 2000

Related U.S. Application Data (60) Provisional application No. 60/116,179, filed on Jan. 14, 1999.

(51) Int. Cl.[7] .............................. G02B 17/00; F21V 1/00
(52) U.S. Cl. ...................... 359/726; 359/727; 362/240; 362/268
(58) Field of Search .................................. 359/726, 727, 359/729; 362/800, 268, 237, 240, 244

(56) References Cited

U.S. PATENT DOCUMENTS 5,590,547 A * 1/1997 Conzelmann ................ 66/132
5,984,494 A * 11/1999 Chapman et al. ........... 362/470

* cited by examiner

Primary Examiner—Georgia Epps
Assistant Examiner—Tim Thompson
(74) Attorney, Agent, or Firm—The Bilicki Law Firm, P.c.

(57) ABSTRACT

The subject invention describes a light assembly using light emitting diodes (LEDs) especially suited for use as a daytime running lamp. The catadioptric light assembly comprises a circuit board, a first set of LEDs secured to a first board, a first collimator disposed in front of the first set of LEDs for directing resultant parallel light beams to a reflective surface. The light beams are reflected by the reflective surface to an inner reflective surface of a housing and are directed, in a parallel fashion, to a lens. A second collimator is disposed in from of the second set of LEDs for directing the resultant parallel light beams directly to the lens. First and second support members, connected to the first and second boards, respectively, absorb and dissipate the heat generated by the LEDs.

20 Claims, 6 Drawing Sheets

CATADIOPTRIC LIGHT EMITTING DIODE ASSEMBLY

This patent application claims priority to United States Provisional Patent Application, Ser. No. 60/116,179 filed on Jan. 14, 1999.

FIELD OF THE INVENTION

This invention relates generally to the field of automotive lighting. More specifically, this invention relates to the field of daytime running lights for automobiles and trucks and the use of light emitting diodes in such lights.

BACKGROUND OF THE INVENTION

Typical automotive lights utilize incandescent lights as the illuminating element of headlights, daytime running lamps, and other various marker or turn signal lamps. The problem with the use of incandescent bulbs is the relatively short life span of such bulbs. A typical lifetime for incandescent bulbs is 1,000 hours of use. Replacing incandescent bulbs results in down time and inefficiencies in terms of use of the vehicle. The need for replacing incandescent bulbs becomes especially problematic with respect to daytime running lamps. These lamps are constantly in use, unlike the intermittent use of the incandescent bulbs in the other types of lamps. While the lifetime for the incandescent bulbs is the same in terms of overall hours of use, because of the constant use of the daytime running lamps, the incandescent bulbs used in the daytime running lamps need to be replaced more often. This creates a greater expense for the owners and operators of vehicles utilizing such lamps, as well as the manufacturer of the lamps, should the lamps need to be replaced within any warranty period.

Light emitting diodes (LEDs) have a longer lifetime than incandescent bulbs. The typical lifetime of a light emitting diode is approximately 50,000 hours before replacement of the LED is necessary. Thus, it is desirable to replace the incandescent bulbs with LEDs in lamps used on vehicles, such as daytime running lamps, stop lamps, front and rear turn signal lamps, and parking lamps. This type of replacement has not been feasible because the typical LED does not produce enough light to meet governmental standards in terms of luminous intensity for use on automobiles and trucks. In addition, typical LEDs do not emit light over as wide a horizontal and vertical range, as do incandescent bulbs nor do they emit as great a quantity of light. This reduced light emission range and intensity requires the use of large arrays of individual LEDs to produce light over the same emission range as incandescent bulbs.

Moreover, some vehicle owners and operator prefer the look of the incandescent lamp over that of a LED lamp. Through the lens of a typical LED based lamp, one can see the light emitted from individual LEDs. By contrast, light emitted from lamps using incandescent bulbs appear to be more uniformly distributed. This invention solves the above-identified problems associated with the use of incandescent bulbs in lamps such as parking lamps, daytime running lamps, and stop and turn signal lamps, while at the same time providing the look and feel, from the viewers' perspective, of an incandescent lamp.

Daytime running lamps must meet certain standards in order to be used on automobiles and tractor-trailers. The U.S. Department of Transportation ("DOT") promulgates these standards as set forth in FMVSS 108. FMVSS 108 has adopted SAE Recommended Practices; but not necessarily the most recent revisions of these standards. Additional standards or recommended practices are promulgated by the Society of Automotive Engineers ("SAE"). The most recent SAE standards or recommended practices are typically more stringent than the standards referenced and promulgated by the DOT. Thus, if a light meets the SAE standards, the same lamp will almost always meet the DOT standards. The SAE Recommended Practice defines a daytime running lamp as a steady burning lamp that is used to improve the conspicuity of a vehicle from the front when the regular headlamps are not required for driving. The light output requirements for daytime running lamps, as described in the SAE Recommended Practice SAE J2087, are as follows:

1) the minimum candela power as measured from the center point of the lamp must be 500. The reader should note that the SAE Recommended Practice details other measurement points and the required minimum candela power. However, the luminous intensity as measured from the center point of the lamp is the highest required minimum;

2) the colors are selected from the following group of colors: white, white to yellow, white to selective yellow, yellow, or selective yellow; and, 3) the daytime running lamp shall have a minimum unobstructed effective projected luminous lens area of 40 $cm^2$. In addition, the daytime running lamp must provide an unobstructed view of the outer lens surface area of at least 10 $cm^2$ measured at 45 degrees to the longitudinal axis of the vehicle.

The DOT regulations require that a daytime running lamp has a luminous intensity not less than 500 candela at test point H-V (the center of the lamp), nor more than 3,000 candela at any location in the beam. The color or frequency of the emitted light may be selected from the group: white, white to yellow, white to selective yellow, selective yellow, or yellow. Any LED light assembly must meet such DOT standards in order to be used on automobiles, trucks, tractor-trailers and other commercial vehicles. Preferably, the automobiles, trucks and tractor-trailers will also meet the SAE Recommended Practice guidelines.

Stop lamps and front and rear turn signal lamps (collectively referred to as indicator lamps) also must meet certain standards in order to be used on automobiles and tractor-trailers. The SAE standard directed to indicator lamps is SAE J2261. The requirements for indicator lamps on vehicles over 80 inches (2032 mm) in width, as described in the SAE Standard SAE J2261, are as follows:

1) for the front turn signal lamp, the minimum luminous intensity as measured from the center point of the lamp is 200 candela. The SAE Standard details other measurement points and the required minimum candela. However, the luminous intensity as measured from the center point of the lamp is the highest required minimum candle power;

2) for the rear stop or turn signal lamp, the minimum luminous intensity as measured from the center point of the lamp is 80 candela;

3) for the yellow turn signal lamp, the minimum luminous intensity as measured from the center point of the lamp is 130 candela;

4) the color of the front turn signal lamp shall be yellow;

5) the color of the rear-turn signal lamp may be red or yellow;

6) the color of the rear stop lamp shall be red; and, 7) the effective projected luminous lighted area of a lamp shall be at least 75 $cm^2$.

Vehicles under 80 inches wide must meet different standards, including SAE J568 for stop lamps, J588 for turn signals, and J319 for rear fog lamps. It should be noted that if the lamps meet SAE Standard J2261, the lamps would meet SAE Standards J568, J588, and J319.

Parking lamps, too, must meet certain standards in order to be used on automobiles and tractor-trailers. The SAE standard directed to parking lamps is SAE J222. The requirements for parking lamps, as described in the SAE Standard SAE J222 are as follows:

1) the minimum luminous intensity as measured from the center point of the lamp is 16.8 candela. The SAE Standard details other measurement points and the required minimum candela. However, the luminous intensity as measured from the center point of the lamps is the highest required minimum candela;
2) the color of the parking light may be white or yellow; and,
3) the lamp must provide a minimum of 13 cm$^2$ of unobstructed projected area from measurable directions.

The above requirements must be met by any light emitting diode lamp assembly that is designed to replace an incandescent bulb assembly for parking lamps, stop and turn lamps, and daytime running lamps.

SUMMARY OF THE INVENTION

The light assembly of the instant invention includes light emitting diodes (LEDs) especially suited for use in a daytime running lamp. A catadioptric light assembly is that which both reflects and refracts light. The catadioptric light assembly of the instant invention further includes a control circuit board, a first set of LEDs secured to a first board. A first collimator is disposed in line with the first set of LEDs so as to direct the emitted light to a contoured reflective surface. The contoured reflective surface directs the emitted light to a parabolic reflective surface that re-directs the emitted light, in parallel rays, to a lens. The instant invention also utilizes a second set of LEDs secured to a second board. A second collimator is disposed in line with the second set of LEDs so as to direct the emitted light from the second set of LEDs to the lens. First and second support members are adapted to receive the first and second boards, respectively. The first and second support members also function as heat sinks so as to absorb and remove the heat generated by the LEDs. In a preferred embodiment, the catadioptric light assembly also includes a housing in the shape of a parabolic reflector having a parabolic reflecting surface disposed on the inside of the housing that houses the boards, the circuit board, and the collimators. A lens is disposed in front of the second collimator and adapted to fit within an opening in the housing.

It is an object of this invention to provide a light emitting diode assembly that is suitable to replace an incandescent lamp assembly for use in a daytime running lamp.

It is an additional object of this invention to provide a light emitting diode assembly that, when energized, provides illumination without the spottiness that is typically associated with LED lamps.

It is also an object of this invention to provide a light emitting diode assembly that is practical and cost effective in comparison to an incandescent bulb assembly.

It is a further object of this invention to provide a light emitting diode assembly that appears, from the perspective of a viewer, to be a lamp with the same illumination effect over the same area as an incandescent bulb assembly.

It is also an object of this invention to provide a light emitting diode assembly for use as a parking lamp.

It is further an object of this invention to provide a light emitting diode assembly for use as a stop lamp, as well as a front and rear turn signal lamp.

Additionally, it is an object of this invention to provide a light emitting diode assembly that meets governmental and SAE standards for use as a stop lamp and front and rear turn signal lamp.

It is also an object of this invention to provide a light emitting diode assembly that meets governmental standards for use as a parking lamp.

It is further an object of this invention to provide a light emitting diode assembly that meets governmental standards and SAE standards for use as a daytime running lamp.

DETAILED DESCRIPTION OF THE PREFERRED EMBODIMENT

The present invention is a light emitting diode LED assembly for use in daytime running lamps and indicator lamps. The LED assembly includes a control circuit board that controls the functioning of the LEDs in the assembly. In a preferred embodiment, all of the power connectors connecting the LEDs to the power source are contained on the control circuit board. In a preferred embodiment, suitable LEDs for use in this assembly are the Barracuda Level 1 High Flux Emitter LEDs manufactured by Hewlett-Packard, Model No. HPWL-BD99 and HPWL-BL99. Preferably, this type of LED is used in conjunction with heat sinks because these LEDs are adapted for high current and high output, both of which result in large amounts of heat that preferably should be drawn away from the LEDs. The radiation pattern of Barracuda LEDs follows the cosine law and presents flat illumination level to secondary optics and delivers a luminous efficiency of approximately 17 lumens per watt. Barracuda LEDs are constructed of aluminum indium gallium phosphide (AlInGaP). Barracuda LEDs cannot be soldered by general IR or vapor-phase reflow or wave soldering techniques. Instead, they should be glued with a thermally conductive adhesive to a heat sink and, preferably, potted. While Barracuda LEDs are preferred, one of ordinary skill in the art should readily appreciate that other types of LEDs may be available for use in the subject invention. The LEDs can be any color, including, but not limited to, amber, red, blue, green or white.

A first support member is adapted to receive at one end a control circuit board and, at the other end, a first board. The first support member also acts as a heat sink. The first support member may be constructed of any material that is thermally conductive, such as aluminum or stainless steel. Preferably, the heat sink is constructed from a lightweight metal material. Most preferred is a heat sink that is constructed from lightweight metallic material such as aluminum. The first support members, preferably, has a ridge and a top portion. The first board is adapted to receive a pillar that connects the first set of LEDs in a spaced relationship to a second set of LEDs. A first board has a plurality of LEDs secured to or embedded in the first board. The LEDs may be embedded on the first board in any typical fashion, including potting, excepting the use of wave soldering. The first board is electrically connected by means of wires to the control circuit board. In a preferred embodiment, the LEDs are glued to the first heat sink using a thermally conductive adhesive and the first support member possesses receiving elements with which the LEDs mate. The receiving elements stabilize and prevent the movement of the LEDs. These receiving elements may be protrusions or indentations in a base inside the first support member. Most preferably, the receiving elements are cylindrical protrusions. The first board possesses a plurality of holes disposed on the board so as to allow the receiving elements from the first support member to contact the plurality of LEDs embedded upon the first board. In an alternate preferred embodiment, an additional structure may be attached to the outer surface of the first support member so as to remove the heat more quickly and efficiently than with the use of the first support member. This additional structure may be in the shape of annular fins or rings. However, one of ordinary skill in the art can readily appreciate other shapes and structures that would also assist in the fast and efficient removal of heat from the first support member.

A first collimator includes a plurality of light directing elements. The first collimator is aligned with the first board so as to collect the light emitted from the LEDs and arrange the emitted light from the LEDs into parallel lines. In a preferred embodiment, the number of light directing elements comprising the collimator corresponds in a one-to-one fashion with the number of light emitting diodes disposed on the first board. The first collimator may be constructed of any suitable rigid transparent material, such as various plastic polymers. In a preferred embodiment, the collimator is constructed of a transparent rigid plastic material. Most preferred is a collimator that is constructed from polycarbonate or acrylic plastic. In a preferred embodiment the shape of the collimator is a plano convex condensing lens. In an alternate preferred embodiment, the collimator may be parabolic, elliptical or hyperbolic in shape. In a second alternate preferred embodiment, an additional element, such as prisms or pillows or a combination of prisms and pillows, may be added to the light directing elements of the collimator so as to collect and distribute some of the light emanating from the extremes of the LEDs. In a third preferred alternate embodiment, a catadioptric ring may be added to the collimator so as to receive additional light from the LEDs.

A second support member may be constructed of any material that is thermally conductive, such as aluminum. The second support member also acts as a heat sink. Preferably, the heat sink is constructed from a lightweight metallic material. More preferred is a second heat sink that is constructed of a lightweight aluminum. A connecting member supports the second support member and joins the second support member, in a spaced relationship, to the first support member. The connecting member extends from the control circuit board through the first support member, the first LED board, and the first collimator, and terminates at the connecting member's to a mirror integral with the second support member. In a preferred embodiment, the connecting member also acts as a conduit for the wires emanating from the first and second boards. The wires provide the electrical connection to the control circuit board. In an alternate preferred embodiment, the pillar may be grooved to provide a channel for the wires emanating from the first and second boards to so as to neatly house the wires for connection to the control circuit board. The second support member is adapted to receive a second board upon which is embedded a plurality of LEDs. This second set of LEDs may be embedded on the second board in any typical fashion, including potting, excepting the use of wave soldering. In a preferred embodiment, the LEDs are glued to the second heat sink using a thermally conductive adhesive and the second heat sink possesses receiving elements with which the LEDs mate. These receiving elements may be protrusions or they may be indentations in a base inside the second heat sink. The second board possesses a plurality of holes disposed on the board so as to allow the receiving elements from the second heat sink to contact the plurality of LEDs embedded upon the second board.

A second collimator, comprising a plurality of light directing elements, is aligned with the second board so as to collect the light emitted from the LEDs and arrange the emitted light from the second set of LEDs in parallel lines. In a preferred embodiment, the number of light directing elements corresponds, in a one-to-one fashion, with the number of light emitting diodes. The collimator may be constructed of any suitable rigid transparent material, including glass. In a preferred embodiment, the reflective surface is a mirror. In a preferred embodiment, the collimator is constructed of a transparent rigid plastic material. Most preferred is a collimator that is constructed from polycarbonate or acrylic plastic. In a preferred embodiment the shape of the collimator is a piano convex condensing lens. In an alternate preferred embodiment, the collimator may be parabolic, elliptical or hyperbolic in shape. In a second alternate preferred embodiment, an additional element, such as prisms or pillows or a combination of prisms and pillows, may be added to the light directing elements of the collimator so as to collect and distribute some of the light emanating from the extremes of the LEDs.

Integral with the second support member is a mirror that is constructed of any suitable reflective material, including aluminum or glass. The mirror reflects the light emitted from the first collimator. The mirror reflects the directed light to a reflective surface of a generally parabolic-shaped housing. The mirror is generally of a parabolic shape. In a preferred embodiment, at the region wherein the mirror joins with the bottom of the second support member, the mirror is contoured in a reflex curve area such that stray light may be gathered and reflected to the inner reflective surface of the housing. The inner reflective surface of the housing is generally parabolic in shape. The inner reflective surface may be constructed of any suitable reflective material, such as aluminum. In a preferred embodiment, the light assembly further includes a housing and a lens. The housing has two openings. The first opening is adapted to receive the first support member. The second opening is opposite the first and is adapted to receive a lens. The parabolic reflective surface of the housing is constructed of a reflective material such as aluminum and may be metallized with aluminum to enhance the reflectivity of the surface. The parabolic reflective surface reflects the light reflected from the mirror in parallel beams to a controlling lens. The lens may be constructed of a transparent rigid material, such as plastic.

In a preferred embodiment, the controlling lens contains distributive pillow optics to distribute the light directed to the lens in an even manner. In an alternate embodiment, the reflective surface that is integral with second support member distributive pillow optics to distribute the light emitted from the first collimator in a manner such that the lens may be smooth or free from distributive pillow optics at its outer portions. However, the inner portion of the lens that is directly in front of the second board and second collimator preferably is pillowed so as to distribute and diffuse the light emitted from the second set of LEDs.

In a first preferred embodiment, the first board includes six individual LEDs that are arranged in a circular pattern. A hole is disposed in the middle of the first board to receive the supporting pillar. The LEDs are disposed around the connecting member in this first preferred embodiment. The first collimator also has six individual light directing elements which correspond to the six LEDs and which are arranged in such a manner that each light directing element is placed directly in front of a corresponding LED. The first collimator also possesses a hole, through the middle thereof, for receiving the supporting pillar. The second LED board is also substantially circular in shape. Six individual LEDs that are arranged in a circular pattern; however, no hole is provided. The second collimator also possesses six light directing elements corresponding to the six LEDs and arranged in such a manner that each light directing element is placed directly in front of a corresponding LED. One of ordinary skill in the art can readily appreciate that the number of LEDs can vary, utilizing either more or less individual LEDs, dependent upon the application for which the assembly is needed.

In a second preferred embodiment, a plurality of annular rings is provided to support the second support member, the second board and the second collimator. The annular rings are supported by the upper surface of the first support member and extend to the second heat sink. The plurality of annular rings are stacked one upon the other so that they enclose the second support member. The annular rings are adapted to receive and support the second support member, second board, and second collimator. The annular rings, preferably, are constructed of a transparent material, such as plastic, so as to allow the light reflected from the mirror to pass through the annular rings to the inner reflective surface of the housing for deflection to the lens. The annular rings also, preferably, have linear prisms disposed along the inner surfaces of the annular rings. The linear prisms distribute light reflected from the mirror evenly such that a diffuse light is reflected from the inner reflective surface of housing to the lens. As one of ordinary skill in the art, the lens and the mirror may contain distributive pillow optics to further distribute and diffuse the light emitted from the LEDs.

In a third preferred embodiment, an attachment member in a generally circular shape extends from the inner surface of the lens and supports the second board and second heat sink. The attachment member supports the second board, second collimator, and second support member in a spaced relationship with respect to the first board, first heat sink and first collimator and with respect to the lens. The attachment member, constructed of a transparent and rigid material such as plastic, so as to support the second board and second support member in place during the rigorous environmental conditions to which daytime running, parking and indicator lamps are subjected. These rigorous environmental conditions include vibratory stress from the operation of the automobile, truck, tractor-trailer or other commercial vehicles on the roadways, weather-related stress including rain, sleet, heat, sun and snow, and physical stress caused by stones and other debris striking hitting the lamps. In this embodiment, the attachment member eliminates the need for the supporting pillar described in the previous embodiments, as well as the holes disposed in the first board, first support member and first collimator.

Figure 1A:
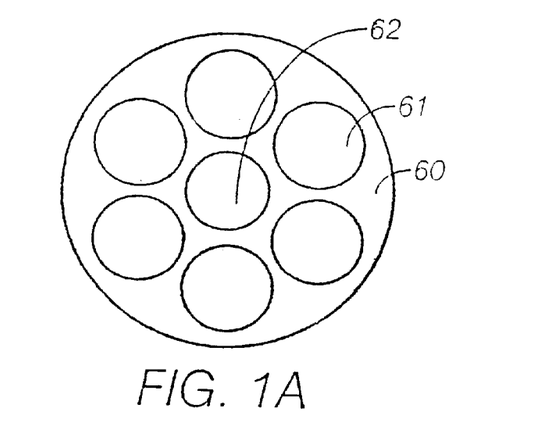
FIG. 1A is a top view of the first collimator of a preferred embodiment of the subject invention.
Figure 1B:
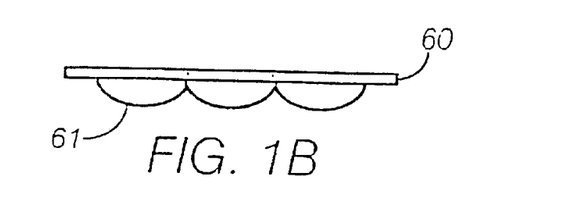
FIG. 1B is a side view of the first collimator of a preferred embodiment of the subject invention.
Figure 1C:
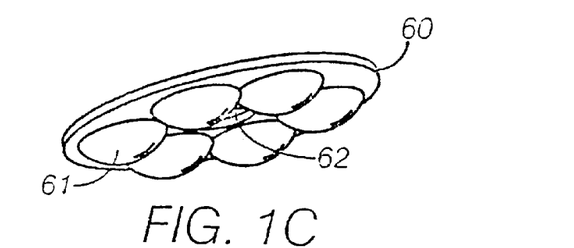
FIG. 1C is a side perspective view of the first collimator of a preferred embodiment of the present invention.
Figure 1D:
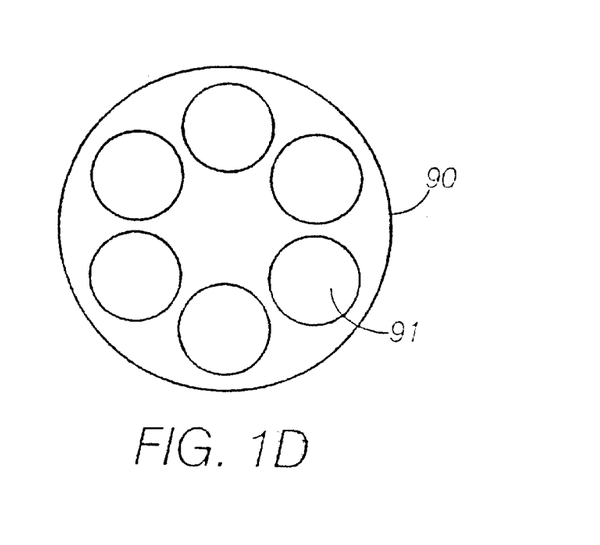
FIG. 1D is a top view of the second collimator of a preferred embodiment of the present invention.

Referring now to the drawings, it should be noted that like reference numerals designate identical or corresponding structures throughout all of the drawings. It should be understood that the drawings are directed to only one of the preferred embodiments described herein. With reference to FIGS. 1A, B, and C, first collimator 60 is circular in shape and possesses a plurality of light directing elements 61 as well as hole 62 in the middle of the first collimator 60. Second collimator 90, shown in FIG. 1D, is also circular in shape and possesses a plurality of light directing elements 91; however, second collimator 80 lacks a hole.

Figure 2:
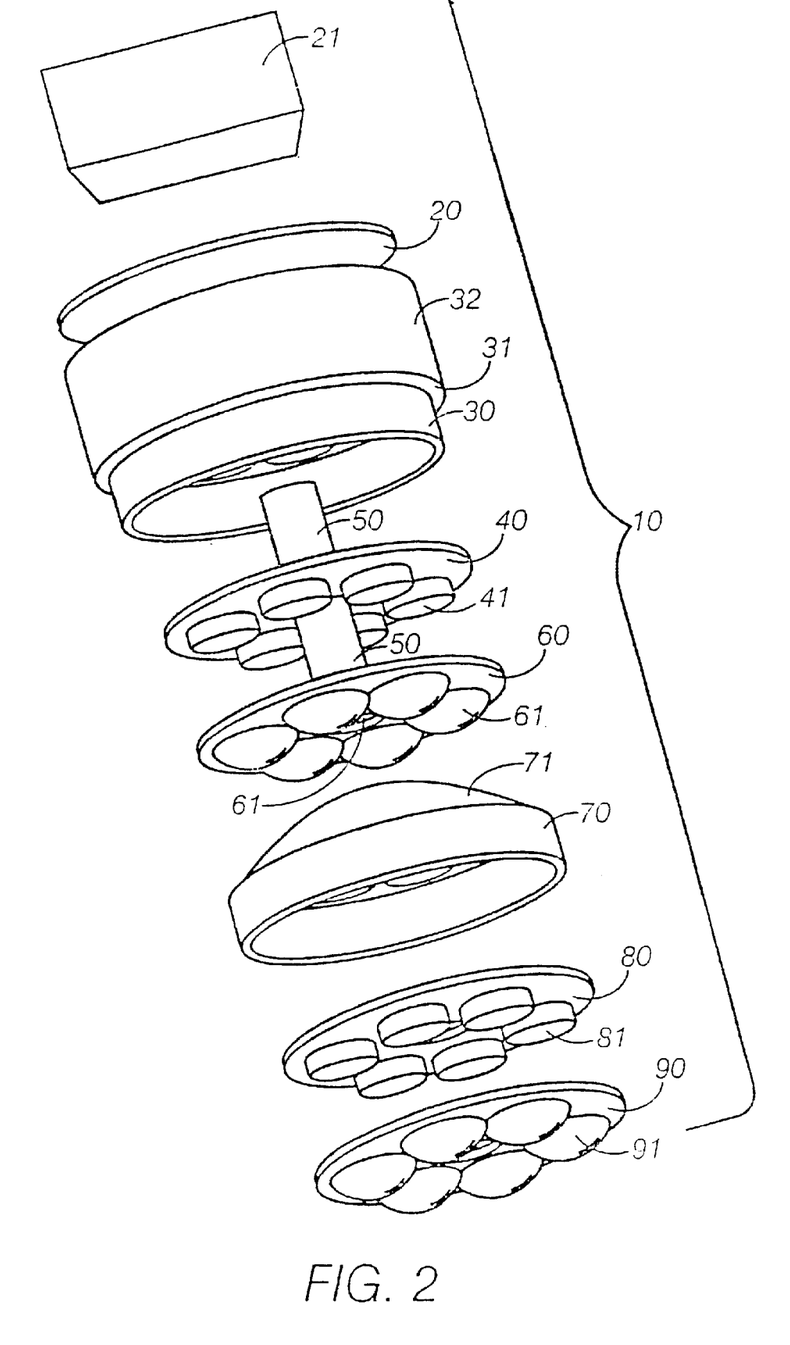
FIG. 2 is a three-dimensional top perspective view of the unassembled elements of a preferred embodiment of the present invention with the control circuit board at the top of the assembly.
Figure 3:
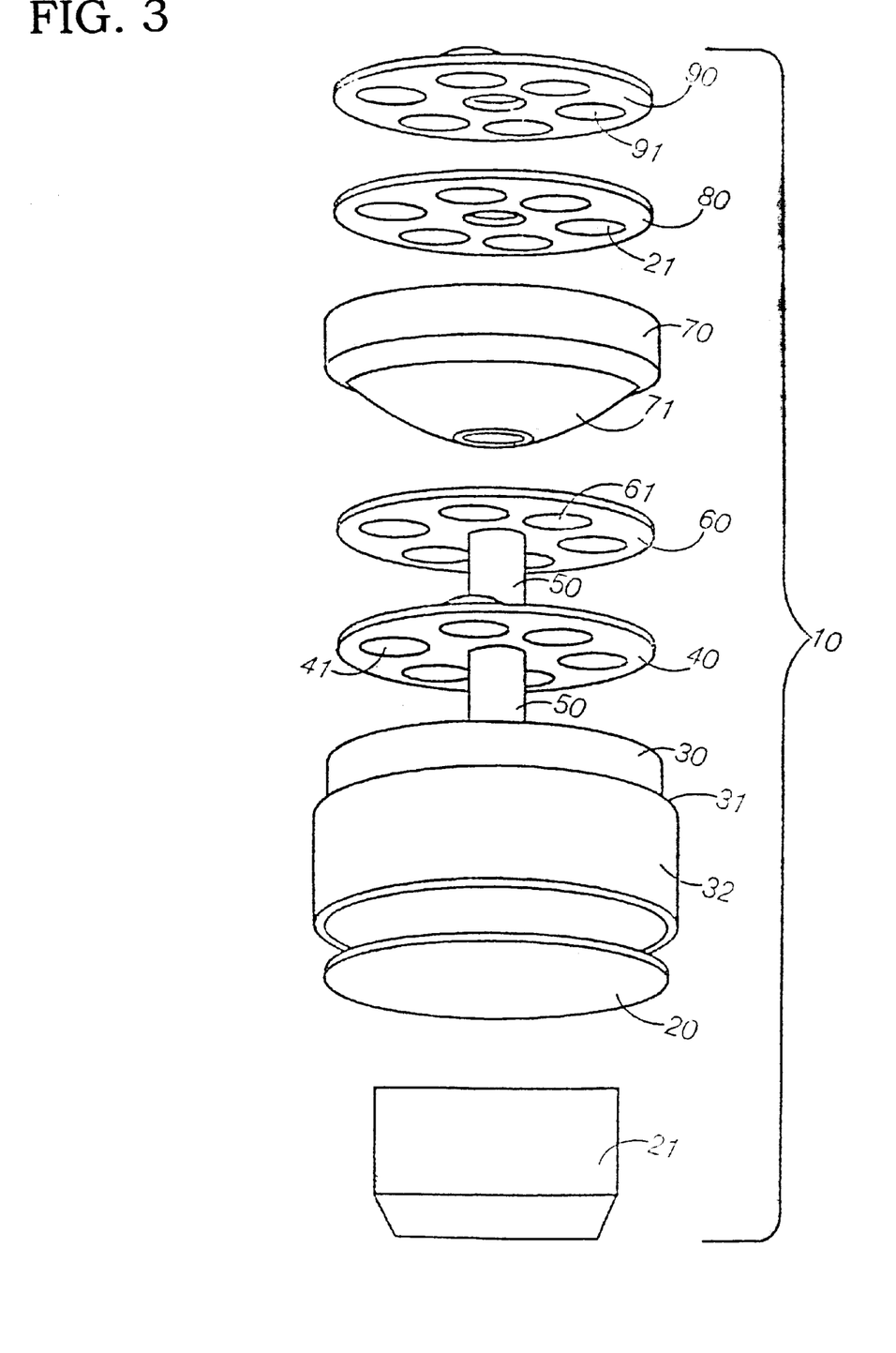
FIG. 3 is a three-dimensional bottom perspective view of the unassembled elements of a preferred embodiment of the present invention with the control circuit board at the bottom of the assembly.
Figure 4:
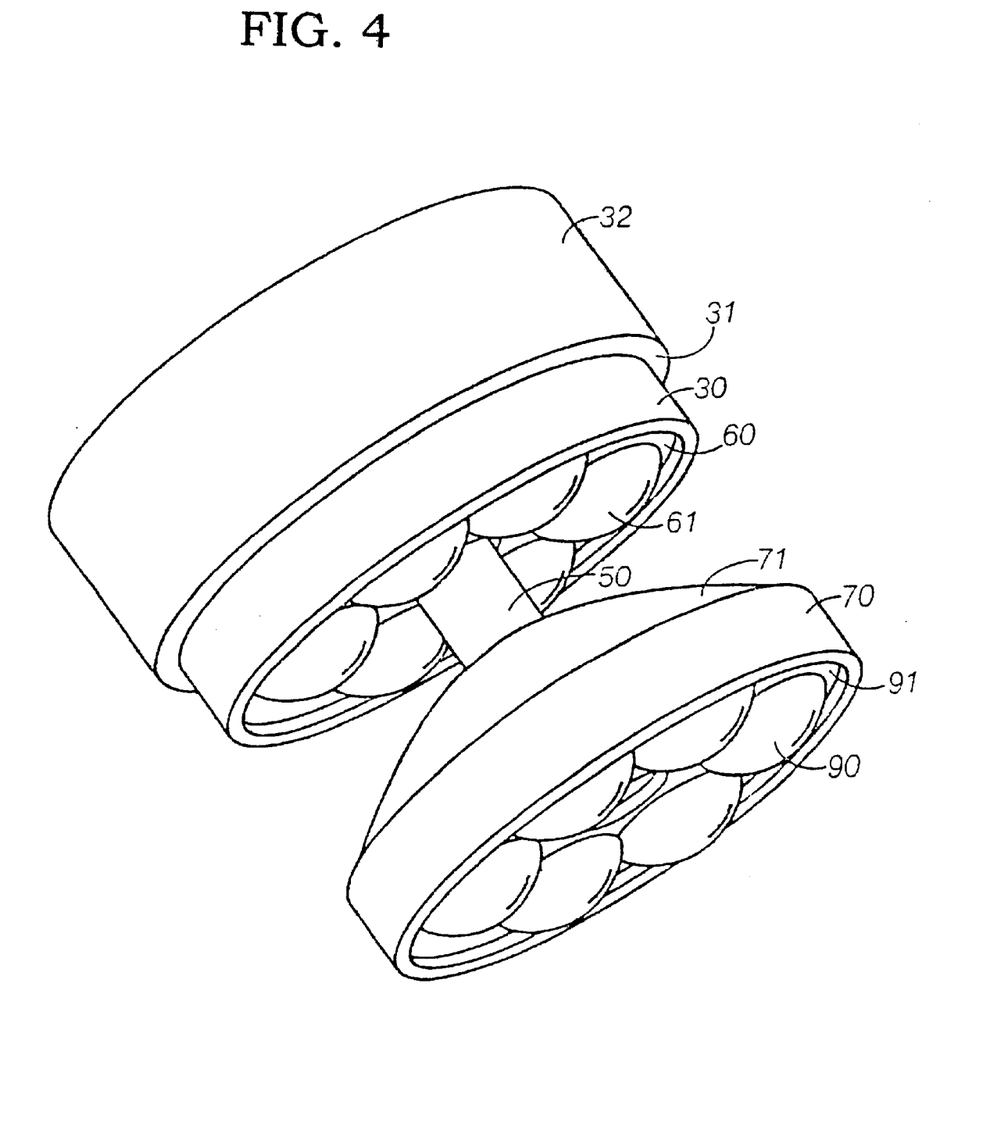
FIG. 4 is a three-dimensional side perspective view of the components depicted in FIGS. 2 and 3 as assembled, in a preferred embodiment of the present LED assembly.

As shown in FIG. 2, LED assembly 10 includes circuit board 20 is a printed circuit board that is secured to first support member 30. Control components 21 consist of circuitry, including but not limited to diodes and resistors, and serve to allow two intensities of light and are operably connected to by means of wires to the circuit board 20 and actuation devices in the interior of the vehicle. First board 40 includes a plurality of light emitting diodes 41 embedded therein. First support member 30 is adapted to receive first board 40. First collimator 60 is placed directly in front of first board 40 such that light directing elements 61 are directly in line with LEDs 41. Connecting member 50 extends from circuit board 20 through first support member 30, first board 40 and first collimator 60. Connecting member 50 terminates at reflective surface 71. In this embodiment, mirror 71 is integral with second support member 70. As one of ordinary skill in the art will appreciate reflective surface 71 may also be fixed or removably secured to second support member 70. Reflective surface 50, preferably, is hollow but rigid and supports second support member 70 and anchors second heat sink 70 to circuit board 20. Connecting member 50 also serves as a conduit for the electrical connecting wires connecting circuit board 20 to the second board 80.

Figure 5:
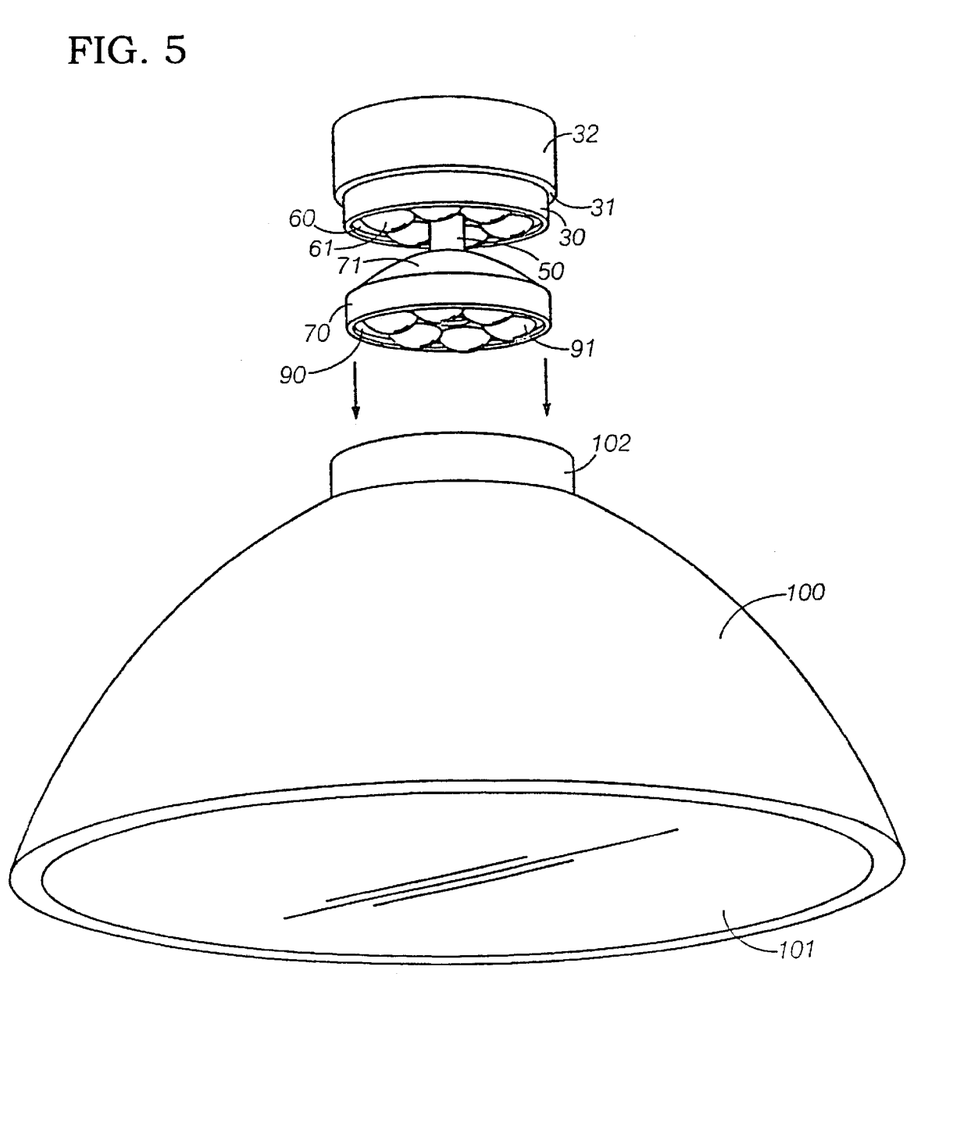
FIG. 5 is a side elevational view of an assembled preferred embodiment of the subject invention about to be inserted into a housing having a parabolic shaped reflective surface.
Figure 6:
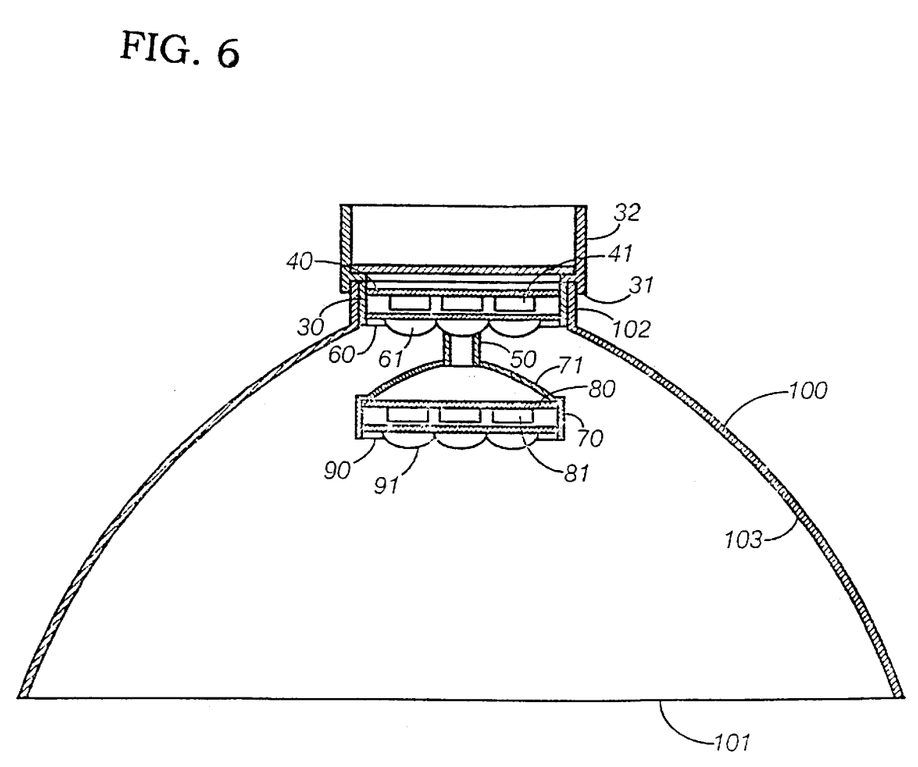
FIG. 6 is a side view of an assembled preferred embodiment of the subject invention as inserted into a housing having a parabolic shaped reflective surface.

With reference to FIG. 5, housing 100 possesses a first opening 102, a second opening (shown covered by the lens 101) and an inner reflective surface 103. First opening 102 is adapted to receive LED assembly 10. When LED assembly 10 is received in said opening 102 of housing 100 as shown in FIG. 6, ridge 31 prevents the top portion 32 of heat sink 30 from passing through opening 102. Lens 101 distributes and diffuses the light emitted from the LEDs 41 and 81 of first and second boards 40 and 80, respectively.

In FIG. 6 is shown the reflective surface which 71 is concave in shape and reflects light emitted from LEDs 41 and passes through light directing elements 61 onto the inner reflective surface 103 of housing 100. Second support member 70 is adapted to receive second board 80, which includes a plurality of LEDs 81 embedded therein. Second support member 80 is also adapted to receive second collimator 90, which possesses a plurality of light directing elements 91. Second collimator 90 is placed directly in front of second board 80. Second collimator 90 collimates the light emitted by the LEDs 81. As a result, parallel beams of light exit light directing elements 91 and travel toward lens 101.

The LED assembly described herein can be adapted to replace almost any incandescent light bulb assembly for use on automotive vehicles. Although the invention is described by reference to specific preferred embodiments, it is clear that variations, modifications and adaptations to this invention can be made without departing from the spirit of the invention as claimed.

What I claim is:

1. A light assembly comprising:
   a circuit board;
   a first support member housing the circuit board;
   a first board having a first plurality of light emitting diodes embedded thereon and operatively connected to the circuit board; said first board being disposed within said first support member;
   a first collimator having a first plurality of light directing elements; said first collimator being mounted on the first board such that the light emitted from said first plurality of light emitting diodes passes through the first plurality of light directing elements;
   a second support member having a reflective surface; said reflective surface operatively arranged to reflect light emitted from the first collimator;
   a connecting member joining the first support member to the second support member in a fixed spatial relationship;
   a second board having a second plurality of light emitting diodes embedded thereon and operatively connected to the circuit board; said second board being disposed within said second support member; and,
   a second collimator having a second plurality of light directing elements; said second collimator being mounted on the second board such that the light emitted from said second plurality of light emitting diodes passes through the second plurality of light directing elements.

2. A light assembly according to claim 1, further comprising:
   a housing having a first opening and a second opening; said first opening adapted to receive and mount to said first support member such that said light emitting diodes are directed at said second opening; and,
   a lens adapted to fit within and cover said second opening.

3. A light assembly according to claim 1 wherein said first and second support members are heat sinks, removing heat generated from said first plurality of light emitting diodes and said second plurality of light emitting diodes, respectively.

4. A light assembly according to claim 1 wherein said connecting member is a pillar.

5. A light assembly according to claim 4 wherein said pillar having a length and possessing a groove along said length.

6. A light assembly according to claim 1 wherein said connecting member is a plurality of transparent rings arranged in a stack.

7. A light assembly according to claim 1 wherein said reflective surface possesses optics to diffuse and direct the light emitted from said first plurality of light emitting diodes.

8. A light assembly according to claim 2 wherein said lens possesses pillow optics to distribute and diffuse light emitted from the first plurality of light emitting diodes and the second plurality of light emitting diodes; and,
   wherein said housing possesses an inner surface; said inner surface constructed of a reflective material and operatively arranged to reflect light received from the first plurality of light emitting diodes and said second plurality of light emitting diodes.

9. A light assembly according to claim 1 wherein said first plurality of light directing elements and said second plurality of light directing elements possesses optics such that the light emitted from the first plurality of light emitting diodes and the second plurality of light emitting diodes is distributed and diffused.

10. A light assembly according to claim 2 for use as a daytime running lamp of a vehicle wherein the light emitted from said assembly possesses a minimum candela power at the center point of the assembly of 500 and a maximum candela power of 3000 at any location; said assembly providing a minimum unobstructed effective projected luminous lens area of 40 $cm^2$ and an unobstructed view of the outer lens surface area of 10 $cm^2$ as measured at 45 degrees to the longitudinal axis of the vehicle.

11. A light assembly according to claim 2 for use as a stop or turn signal lamp of a vehicle wherein the light emitted from said assembly possesses a minimum luminous intensity at the center point of the assembly of 200; said assembly providing an effective projected luminous lighted area of 75 $cm^2$.

12. A light assembly according to claim 2 for use as a parking lamp of a vehicle wherein the light emitted from said assembly possesses a minimum luminous intensity at the center point of the assembly of 16.8; said assembly providing an unobstructed projected area of 13 $cm^2$.

13. A light assembly comprising:
   a circuit board;
   a first support member housing the circuit board;
   a first board having a first plurality of light emitting diodes embedded thereon and operatively connected to the circuit board; said first board being disposed within said first support member;
   a first collimator having a first plurality of light directing elements; said first collimator being mounted on the first board such that the light emitted from said first plurality of light emitting diodes passes through the first plurality of light directing elements;
   a second support member having a reflective surface; said reflective surface operatively arranged to reflect light emitted from the first collimator;
   a second board having a second plurality of light emitting diodes embedded thereon and operatively connected to the circuit board; said second board being disposed within said second support member;
   a second collimator having a second plurality of light directing elements; said second collimator being mounted on the second board such that the light emitted from said second plurality of light emitting diodes passes through the second plurality of light directing elements;
   a housing having a first opening and a second opening; said first opening adapted to receive and mount to said first support member such that said light emitting diodes are directed at said second opening; and,
   a lens adapted to fit within and cover said second opening, said lens having an inner surface;

an attachment member connected to the second support member and the inner surface of the lens.

14. A light assembly according to claim 13 wherein said first and second support members are heat sinks, removing heat generated from said first plurality of light emitting diodes and said second plurality of light emitting diodes, respectively.

15. A light assembly according to claim 13 wherein:

said lens possesses pillow optics to distribute and diffuse light emitted from the first plurality of light emitting diodes and the second plurality of light emitting diodes;

said reflective surface possesses optics to diffuse and direct the light emitted from said first plurality of light emitting diodes;

said attachment member is made of a transparent material; and, said housing possesses an inner surface; said inner surface constructed of a reflective material and operatively arranged to reflect light received from the first plurality of light emitting diodes and said second plurality of light emitting diodes.

16. A light assembly according to claim 13 wherein said first plurality of light directing elements and said second plurality of light directing elements possesses optics such that the light emitted from the first plurality of light emitting diodes and the second plurality of light emitting diodes is distributed and diffused.

17. A light assembly according to claim 13 for use as a daytime running lamp of a vehicle wherein the light emitted from said assembly possesses a minimum candela power at the center point of the assembly of 500 and a maximum candela power of 3000 at any location; said assembly providing a minimum unobstructed effective projected luminous lens area of 40 $cm^2$ and an unobstructed view of the outer lens surface area of 10 $cm^2$ as measured at 45 degrees to the longitudinal axis of the vehicle.

18. A light assembly according to claim 13 for use as a stop or turn signal lamp of a vehicle wherein the light emitted from said assembly possesses a minimum luminous intensity at the center point of the assembly of 200; said assembly providing an effective projected luminous lighted area of 75 $cm^2$.

19. A light assembly according to claim 13 for use as a parking lamp of a vehicle wherein the light emitted from said assembly possesses a minimum luminous intensity at the center point of the assembly of 16.8; said assembly providing an unobstructed projected area of 13 $cm^2$.

20. A light assembly comprising:

a circuit board;

a support member housing said circuit board;

a board having a plurality of light emitting diodes embedded thereon and operatively connected to said circuit board, said board being disposed within said support member;

a collimator having a plurality of light directing elements, said collimator being mounted on said board such that light emitted from said plurality of light emitting diodes passes through said plurality of light directing elements;

a first reflective member, said first reflective member operatively arranged to reflect said light emitted from said collimator;

a second reflective member operatively arranged to reflect said light reflected from said first reflective member; and, a lens adapted to transmit said light reflected from said second reflective member.

* * * * *